May 20, 1952  G. E. MEGEL ET AL  2,597,161
BEARING STRUCTURE
Filed June 22, 1948
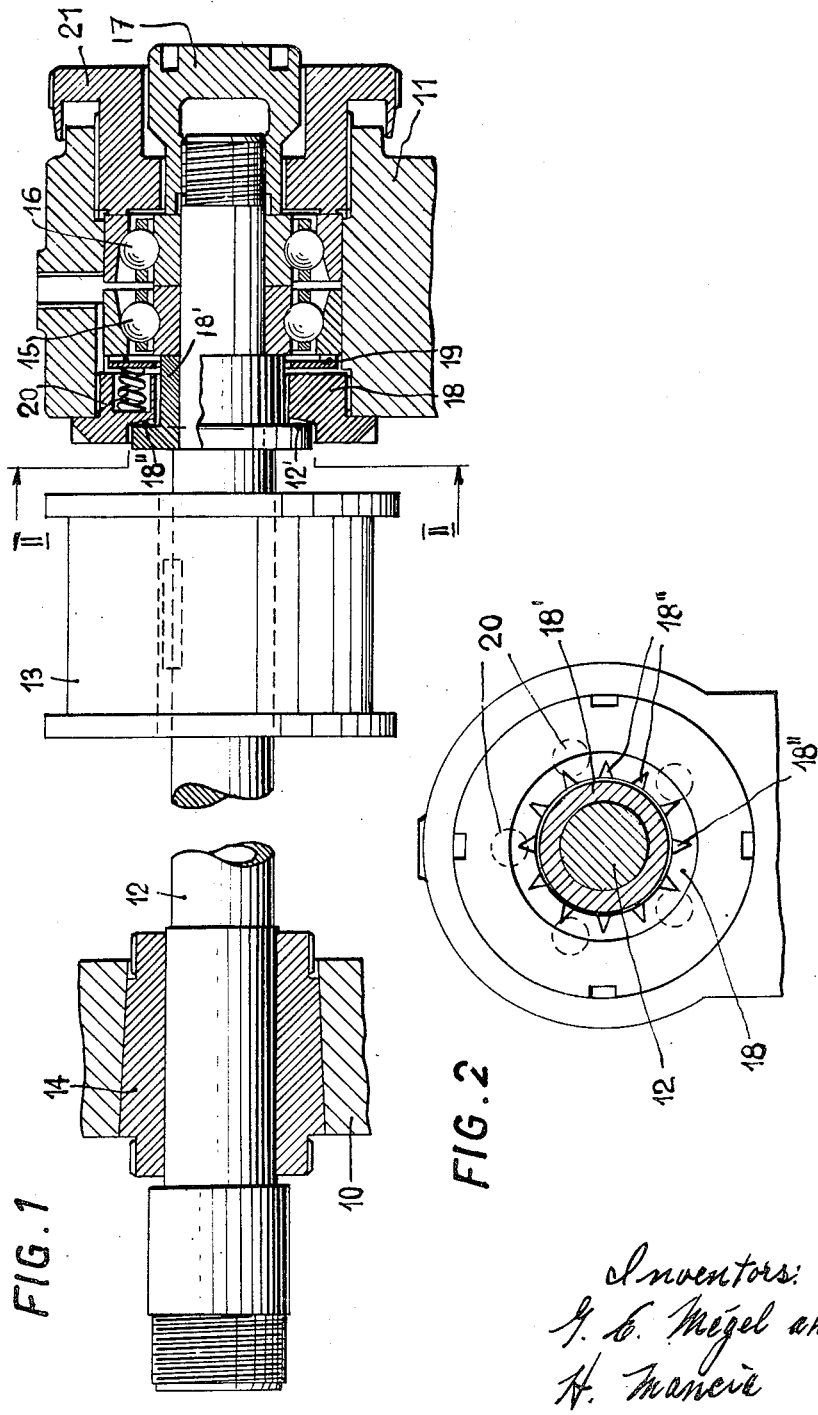
Inventors:
G. E. Megel and
H. Mancia
By C. F. Henderoth
att Patented May 20, 1952

2,597,161

UNITED STATES PATENT OFFICE 2,597,161

BEARING STRUCTURE

Guillaume Ernest Mégel and Henri Mancia, Moutier, Switzerland, assignors of one-half to Usines Tornos Fabrique de Machines Moutier S. A., Moutier, Switzerland Application June 22, 1948, Serial No. 34,388
In Switzerland June 28, 1947

5 Claims. (Cl. 308—189)

The object of the present invention is a bearing structure, in particular for the rotating spindle of a movable headstock, provided with a ball bearing capable of taking the axial thrust of the spindle.

According to the invention, the bearing structure is characterized by an auxiliary thrust ring serving as a thrust bearing for a shoulder provided on the spindle and between which ring and the ball bearing are interposed compression springs which through a pressure ring act only on the outer race of the ball bearing thereby preloading the ball bearing. Preferably a regulating ring screw is screwed into the standard from the outer end, this ring screw engages the outer race only of the ball bearing so that by screwing in this ring the ball bearing, and with it the spindle, and its shoulder all as a whole are displaced against the thrust of the springs in the direction of reduction of the axial pressure with which the shoulder bears against the thrust ring. If the ring screw is screwed far enough the shoulder will be moved clear of the auxiliary thrust ring and the spindle thrust will be taken by the ball bearing. If the ring is screwed outwards, the spindle thrust will be taken wholly by the auxiliary ring, the springs maintaining a preload on the ball bearing. Over a small range of adjustment the thrust load will be divided between the auxiliary ring and the ball bearing. Through the whole range of adjustment necessary to make the change, however, the preload due to the springs will be substantially the same because the necessary movement is small.

The application of such a bearing comprising an auxiliary thrust ring as well as a ball bearing, enables a machined finish to be obtained on the work pieces which is superior to that obtained when the thrust bearing of the spindle is constituted solely by a ball bearing, while retaining the advantage which is obtained by the use of a ball thrust bearing as compared with a plain thrust bearing, having regard to the possibility of high speed of rotation of the spindle.

In the drawings:

Figure 1 is a longitudinal section of part of a movable headstock of an automatic screw machine, of which one of the bearings for the rotating spindle is constructed according to the invention, and Figure 2 is a transverse section on the section line II—II of Figure 1.

The movable headstock according to Figures 1 and 2 comprises a front standard 10 and a rear standard 11 forming the bearing housings in which is journalled the rotating spindle 12 carrying a driving pulley 13. The bearing mounted in the front standard is a bushing 14 while the bearing mounted in the rear standard 11 is of the adjustable axial thrust type. This bearing comprises a double ball bearing 15, 16 clamped against a shoulder of the spindle 12 by a clamping nut 17 screwed on the threaded end of the spindle 12. By virtue of its form this ball bearing can carry the axial and radial loads of the spindle 12. To relieve the bearing 15, 16 of part or all of the axial load to which it is subjected, an auxiliary thrust ring 18 (preferably of bronze) is provided, screwed into the standard 11 from the front or inner end. Between this ring 18 and the corresponding part 15 of the ball bearing, an intermediate pressure ring 19 is provided on the spindle 12, which only bears against the outer race of the bearing part 15 and which is acted upon by compression springs 20 interposed between it and the ring 18 thus preloading the ball bearing. These springs urge the spindle axially towards the standard 11 and if there is no restraint a disc on the spindle 12 forming a shoulder 12', is thereby pressed against the ring 18. Into the rear or outer end of the standard 11 is screwed a micrometer regulating ring screw 21 which engages only the outer race of the ball bearing part 16. It will be understood that by screwing in the ring screw the bearing 15, 16 and with it the spindle 12 and its shoulder 12' all as a whole are displaced against the pressure of the compression springs 20 in a direction to reduce the pressure with which the shoulder 12' bears against the ring 18. If screwed in far enough the shoulder 12' will clear the ring 18 entirely, while if screwed out far enough the whole thrust of the spindle will be taken by the ring 18. Over a small movement of the screw 21, the thrust of the spindle will be shared between the ball bearing and the ring 18. It is thus possible to divide the axial load of the spindle 12 in the desired proportion between the ball bearing 15, 16 and the auxiliary thrust ring 18. As the total movement of the ring screw 21 to change from one condition to the other is very small, there is substantially no change in the preload due to the springs 20 when a change is made. In other words it is possible to regulate with precision the thrust of the shoulder 12' against the ring 18 while maintaining an axial thrust on the ball bearing 15, 16. The lubrication of the thrust shoulder 12' takes place through the clearance between the ring 18 and the sleeve 18' forming the part of the spindle over which the ring extends. The oil will thus reach the internal circumference of the thrust piece of the ring 18 and will be thrown outwardly by centrifugal force through notches 18" distributed around this thrust face, as can be seen in Figure 2.

What we claim is:

1. In a bearing structure for the rotating spindle of a headstock, the combination of a shoulder on the spindle, an auxiliary thrust ring in the headstock serving as a thrust bearing for said shoulder, a ball bearing on the side of said thrust ring opposite said shoulder having its inner race fast on the spindle and its outer race slidably seated in the headstock, a pressure ring between said thrust ring and said ball bearing acting against the outer race only of said bearing, and compression springs between said thrust ring and said pressure ring thereby to preload said ball bearing.

2. A bearing structure as set forth in claim 1 and including a regulating screw screwable into the outer end of the headstock and engaging the outer race only of said ball bearing, whereby upon screwing in said regulating screw the ball bearing and with it the spindle and its shoulder, all as a unit, are displaced against the thrust of the springs in the direction of reduction of the axial pressure with which said shoulder bears against said thrust ring.

3. A bearing structure as set forth in claim 2 wherein said thrust ring screws into the bearing standard of the headstock from the inner end.

4. A bearing structure as set forth in claim 3 wherein sufficient clearance is left between said thrust ring and the spindle shoulder part over which it extends, to permit the passage of oil to the internal circumference of the thrust face of the thrust ring, said face having notches distributed around it through which the oil will be projected outwards by centrifugal force.

5. A bearing structure as set forth in claim 1 wherein sufficient clearance is left between said thrust ring and the spindle shoulder over which it extends, to permit the passage of oil to the internal circumference of the thrust face of the thrust ring, said face having notches distributed around it through which the oil will be projected outwards by centrifugal force.

GUILLAUME ERNEST MÉGEL.
HENRI MANCIA.

REFERENCES CITED

The following references are of record in the file of this patent:

UNITED STATES PATENTS

| Number | Name | Date |
|---|---|---|
| 1,767,429 | Brittain | June 24, 1930 |
| 2,227,697 | Blood | Jan. 7, 1941 |
| 2,387,105 | Yager | Oct. 16, 1945 |